(12) United States Patent
Simon et al.

(10) Patent No.: US 8,710,846 B2
(45) Date of Patent: Apr. 29, 2014

(54) ELECTROMAGNETIC PROBE FOR MEASURING PROPERTIES OF A SUBSURFACE FORMATION

(75) Inventors: Matthieu Simon, St Princeton, NJ (US); Henri Budan, St Remy les Chevreuses (FR); Laurent Mosse, Montrouge (FR); Mehdi Hizem, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 117 days.

(21) Appl. No.: 13/345,749

(22) Filed: Jan. 8, 2012

(65) Prior Publication Data

US 2013/0009646 A1    Jan. 10, 2013

Related U.S. Application Data

(63) Continuation of application No. 11/816,309, filed on Mar. 14, 2008.

(30) Foreign Application Priority Data

Feb. 22, 2005   (EP) ..................................... 05290389

(51) Int. Cl.
*G01V 3/00* (2006.01)
(52) U.S. Cl.
USPC .......................................... 324/367; 324/339
(58) Field of Classification Search
USPC .......................... 324/338, 339, 341, 343, 367
See application file for complete search history.

(56) References Cited

U.S. PATENT DOCUMENTS

| | | | |
|---|---|---|---|
| 3,849,721 A | 11/1974 | Calvert | |
| 3,944,910 A | 3/1976 | Rau | |
| 4,063,151 A | 12/1977 | Suau et al. | |
| 4,511,842 A | 4/1985 | Moran et al. | |
| 4,626,773 A | 12/1986 | Kroeger et al. | |
| 5,210,495 A | 5/1993 | Hapashy et al. | |
| 5,345,179 A | 9/1994 | Habashy et al. | |
| 5,367,262 A * | 11/1994 | Manning | 324/341 |

(Continued)

FOREIGN PATENT DOCUMENTS

EP    0869376    6/2013

OTHER PUBLICATIONS

B.I. Anderson, et al., "The Response of Dielectric Logging Tools to Dipping Thin Beds," SPE, Sep. 25, 1994, pp. 795-810.

*Primary Examiner* — Jay Patidar
*Assistant Examiner* — David M. Schindler
(74) *Attorney, Agent, or Firm* — Stephanie Chi; Jody DeStefanis (57) ABSTRACT

A probe for measuring electromagnetic properties of a subsurface formation includes a pad having a face adapted for engagement with a borehole wall, a pair of transmitting antennas, and two pairs of receiving antennas. The transmitting antennas and receiving antennas are mounted in the face of the pad, and each of the two pairs of receiving antennas include a first and second antenna distributed on opposite sides of the pair of transmitting antennas. The probe further includes an electronic arrangement having a transmitter module and a receiver module. The transmitter module is arranged to operate the pair of transmitting antennas in either a broadside mode or an endfire mode by applying an excitation signal modulated by two or more frequencies, and the receiver module is arranged to determine an attenuation and a phase shift of each reception signal provided by each receiving antenna relatively to the excitation signal.

13 Claims, 6 Drawing Sheets

(56) References Cited

U.S. PATENT DOCUMENTS

| | | |
|---|---|---|
| 5,406,206 A | 4/1995 | Safinya et al. |
| 5,434,507 A | 7/1995 | Beren et al. |
| 5,892,361 A | 4/1999 | Meyer, Jr. et al. |
| 7,239,145 B2 | 7/2007 | Homan et al. |
| 7,327,146 B2 | 2/2008 | Simon |

\* cited by examiner

ELECTROMAGNETIC PROBE FOR MEASURING PROPERTIES OF A SUBSURFACE FORMATION

CROSS-REFERENCE TO RELATED APPLICATION

This application is a continuation of U.S. application Ser. No. 11/816,309, filed Mar. 14, 2008, which is a National Stage of International Application No. PCT/EP2006/000776, filed Jan. 27, 2006, which claims the benefit of European Application No. 05290389.5, filed Feb. 22, 2005.

FIELD OF THE INVENTION

The invention relates to an electromagnetic probe for measuring the electromagnetic properties of a subsurface formation in a limited zone surrounding a bore hole. Another aspect of the invention relates to a logging tool comprises such a probe for performing logs of subsurface formation bore hole.

A further aspect of the invention relates to a method for measuring the electromagnetic properties of a subsurface formation in a limited zone surrounding a bore hole.

A particular application of the probe, the logging tool and the method according to the invention relates to the oilfield services industry.

BACKGROUND OF THE INVENTION

Logging devices which measure formation dielectric constant are known, for example from U.S. Pat. No. 3,849,721 and U.S. Pat. No. 3,944,910. The logging device includes a transmitter and spaced receivers mounted in a pad that is urged against a bore hole wall. An electromagnetic microwave is transmitted into the formations, and the wave which has propagated through the formations is received at the receiving antennas. The phase shift and attenuation of this wave propagating in the formations is determined from the receivers output signals. The dielectric constant and the conductivity of the formations can then be obtained from the phase shift and attenuation measurements. Two transmitters are generally used in a bore hole compensated array to minimize the effect of bore hole rugosity, tool tilt, and dissimilarities in the transmitters, receivers, and their electronic circuits.

SUMMARY OF THE INVENTION

One goal of the invention is to propose an electromagnetic probe and/or method for measuring the electromagnetic properties of a subsurface formation in a limited zone surrounding a bore hole with a better accuracy than prior art device and/or method.

According to the invention, it is proposed an electromagnetic probe for performing electromagnetic measurements of the formation dielectric properties according to different wave polarization, at different investigation depths within the formation (radial depths) and at different frequencies.

The electromagnetic probe is intended to measure the dielectric permittivity and electric conductivity of geological formation surrounding the bore hole. The measurements are differential measurements based on phase shift and amplitude attenuation of electromagnetic waves between two transmitting antennas towards at least two receiving antennas encompassing the transmitting antennas. Under the control of an electronic arrangement, emitting antennas are excited and reception signals at receiving antennas are measured. The attenuation and phase shift measured between the two emitting antennas gives the apparent wave vector known as k, which is directly linked to the permittivity and conductivity of the formation. However, this measurement is affected by the presence of an eventual mudcake on the well-bore wall and fluid mixture (drilling fluid) into the formation. This uncertainty is resolved by performing additional measurements, each measuring an additional phase shift and an additional attenuation.

A first set of additional measurements are performed with different polarizations, one according to a broadside mode and one according to an endfire mode. A second set of additional measurements are performed with various depths of investigation. A third set of additional measurement is performed in order to determine the dielectric properties of the mudcake and the fluid mixture. These additional measurements provide a set of coherent and complementary data enabling to determine the mudcake thickness, and permittivity and conductivity of the fluid mixture, the mudcake and the formation at different radial depths and at different frequencies.

More precisely, a first aspect of the present invention relates to an electromagnetic probe for measuring the electromagnetic properties of a subsurface formation in a limited zone surrounding a well-bore hole, the well-bore hole being filled with a well-bore fluid. The probe comprises a pad having a first face defining a first area arranged to be positioned in contact with a well-bore wall. The probe further comprises:
  at least two transmitting antennas defining a central point between them,
  at least a first and a second set of receiving antennas, each set comprising a first receiving antenna and a second receiving antenna, the first receiving antenna being positioned on one side of the transmitting antennas and the second receiving antenna being positioned on other side of the transmitting antennas so that each set encompass the transmitting antennas,
  the first set of receiving antennas is spaced from a first distance from the central point, the second set of receiving antennas is spaced from a second distance from the central point, the second distance being greater than the first distance,
  the transmitting and receiving antennas are positioned along a line in the first face,
  an electronic arrangement comprising at least one transmitter module arranged to excite the transmitting antennas by applying an excitation signal according to at least a first and a second frequency, and at least one receiver module coupled to at least one receiving antenna and arranged to determine an attenuation and a phase shift of each reception signal provided by each receiving antenna relatively to the excitation signal.

The transmitting antennas of the probe are sensibly identical, each antenna comprising two perpendicular dipoles embedded in a cavity and arranged to transmit electromagnetic energy according to a broadside mode and an endfire mode.

The receiving antennas of the probe are sensibly identical, each antenna comprising two perpendicular dipoles embedded in a cavity and arranged to receive electromagnetic energy according to a broadside mode and an endfire mode.

According to another aspect of the invention, the probe further comprises a first open-ended coaxial wire arranged in the first side and positioned sensibly perpendicularly to the first area between a transmitting antenna and a receiving antenna.

According to still another aspect of the invention, the pad further comprises a second face arranged to be in contact with the well-bore fluid, and the probe further comprises a second open-ended coaxial wire arranged in the second face.

According to a further aspect of the invention, the electronic arrangement comprises a first open ended coaxial wire controlling circuit, said circuit comprising:
 a transmitting module for sending a high-frequency input signal into the first open ended coaxial wire, and
 a receiving module for determining a first reflection coefficient based on a high frequency output signal reflected at the aperture of the first open-ended coaxial wire and a propagation coefficient based on a high frequency output signal received by the first open-ended coaxial wire following an excitation of the transmitting antennas. The electronic arrangement may further comprise a second open ended coaxial wire controlling circuit, said circuit comprising:
 a transmitting module for sending a high-frequency input signal into the second open ended coaxial wire, and
 a receiving module for determining a second reflection coefficient based on a high frequency output signal reflected at the aperture of the second open-ended coaxial wire.

Advantageously, the electronic arrangement of the electromagnetic probe of the invention has a homodyne architecture comprising a variable high frequency source providing a high frequency signal to:
 the at least one transmitter module arranged to excite the transmitting antennas,
 the at least one receiver module coupled to the at least one receiving antenna, and
 the transmitting module and the receiving module of the first and second open ended coaxial wire controlling circuits.

Another aspect of the present invention relates to a logging tool arranged to be deployed in a well-bore hole, wherein the logging tool comprises an electromagnetic probe according to the invention and a positioning arrangement for positioning the probe in contact with a well-bore wall at a determined depth.

Still another aspect of the present invention relates to a method for measuring the electromagnetic properties of a subsurface formation in a limited zone surrounding a well-bore hole, the well-bore hole being filled with a well-bore fluid.

The method comprises the steps of:
 a) positioning the probe according to the invention at a first depth,
 b) transmitting an excitation electromagnetic energy around a central point into the limited zone by energizing the first transmitting antenna with an excitation signal according to a broadside mode and according to a first frequency,
 c) measuring a broadside/broadside reception signal at the receiving antennas according to a broadside mode and measuring simultaneously a broadside/endfire reception signal at the receiving antennas according to an endfire mode, at least at a first distance and at a second distance from the central point,
 d) repeating the transmitting step b) and the measuring steps c) by energizing the second transmitting antenna with an excitation signal according to a broadside mode and according to a first frequency,
 e) transmitting an excitation electromagnetic energy around a central point into the limited zone by energizing the transmitting antennas with an excitation signal according to an endfire mode and according to the first frequency,
 f) measuring an endfire/endfire reception signal at the receiving antennas according to the broadside mode and measuring simultaneously an endfire/broadside reception signal at the receiving antennas according to the endfire mode at least at the first distance and at a second distance from the central point,
 g) repeating the transmitting step e) and the measuring steps f) by energizing the second transmitting antenna with an excitation signal according to an endfire mode and according to a first frequency, and
 h) repeating the steps b) to g) at least at a second frequency.

Optionally, the transmitting steps b), d), e) and g) may be performed simultaneously, the excitation electromagnetic energy transmitted by the first transmitting antennas being signed by a first low frequency, the excitation electromagnetic energy transmitted by the second transmitting antennas being signed by a second low frequency.

Optionally, the transmitting steps b) to h) may be performed simultaneously, the excitation signal comprising a plurality of frequencies, at least the first and the second frequencies.

According to another aspect of the invention, the method further comprises the steps of:
 determining an attenuation and a phase shift of each reception signal provided by each receiving antenna relatively to the excitation signal,
 estimating the electromagnetic properties of the subsurface formation in the limited zone surrounding the well-bore hole for at least a first radial investigation depth correlated to the first distance and a second radial investigation depth correlated to the second distance.

According to another aspect of the invention, the method further comprises the steps of:
 measuring a high frequency output signal received by a first open-ended coaxial wire following an excitation of the transmitting antennas,
 determining an attenuation of the high frequency output signal relatively to the excitation signal, and
 estimating a thickness of a mudcake on the well-bore wall by determining a transmission coefficient based on the attenuation and phase shift.

According to still another aspect of the invention, the method further comprises the steps of:
 measuring a high frequency output signal received by the receiving antennas following an excitation of a first open-ended coaxial wire,
 determining an attenuation and a phase shift of the high frequency output signal relatively to the excitation signal, and
 estimating a thickness of a mudcake on the well-bore wall by determining a propagation coefficient based on the attenuation.

According to still another aspect of the invention, the method further comprises the steps of:
 sending a high-frequency input signal into a first open ended coaxial wire in contact with the well-bore wall,
 measuring a high frequency output signal reflected by the mudcake via the first open-ended coaxial wire,
 estimating the electromagnetic properties of the mudcake on the well-bore wall by determining a mudcake reflection coefficient based on the high frequency output signal.

According to still another aspect of the invention, the method further comprises the steps of:
 sending a high-frequency input signal into a second open ended coaxial wire in contact with a well-bore fluid,
 measuring a high frequency output signal reflected by the second open-ended coaxial wire, estimating the electromagnetic properties of the well-bore fluid by determining a well-bore fluid reflection coefficient based on the high frequency output signal.

According to still another aspect of the invention, the method further comprises the step of comparing the signals provided by the first open ended coaxial wire and the second open ended coaxial wire for estimating the quality of the pad application against the bore-hole wall.

According to another aspect of the invention, the method further comprises the steps of correcting the calculated electromagnetic properties of the subsurface formation in the limited zone surrounding the well-bore hole based on the estimated electromagnetic properties and the thickness of the mudcake. This correction yields the radial profile electromagnetic properties of the geological formation free of mudcake effects.

The electromagnetic probe of the invention enables a higher measurement accuracy than the electromagnetic propagation tool as described in the prior art.

With the method of the invention, it is possible to estimate the electromagnetic properties in a radial profile away from the well-bore wall and/or at different frequencies.

The electromagnetic probe according to the invention enables to reduce uncertainties during interpretation of petrophysical data. The electromagnetic probe measurements are based on high frequency electromagnetic waves interaction with water molecules in the matrix pores of the geological formation. These measurements yield information on fluids occupying the matrix pores, on the matrix itself, the fluid to matrix interaction and on the geological structure of the formation.

BRIEF DESCRIPTION OF THE DRAWINGS

The present invention is illustrated by way of examples and not limited to the accompanying figures, in which like references indicate similar elements:

FIG. 1.A schematically illustrates a typical onshore hydrocarbon well location;

FIG. 1.B schematically illustrates a top view of a bore hole in a geological formation;

FIGS. 2.A, 2.B, 2.C schematically show a cross-section view, a bore hole wall contacting side view and a bore hole fluid contacting side view of a probe for measuring the electromagnetic properties of a subsurface formation according to the invention, respectively;

FIG. 3.A schematically shows in greater details a cross-section view in a cross dipole antenna of the probe according to the invention;

FIGS. 3.B and 3.C schematically illustrate the cross dipole antenna of FIG. 3.A in an endfire mode and in a broadside mode, respectively;

FIGS. 7.A and 7.B show a typical envelope of the radial depth sensitivity response measured by the receiving antennas according to the endfire mode and the broadside mode, respectively; and FIGS. 8.A and 8.B show typical permittivity and conductivity dispersion curves relatively to the frequency, respectively.

DETAILED DESCRIPTION OF THE INVENTION

Figure 1:
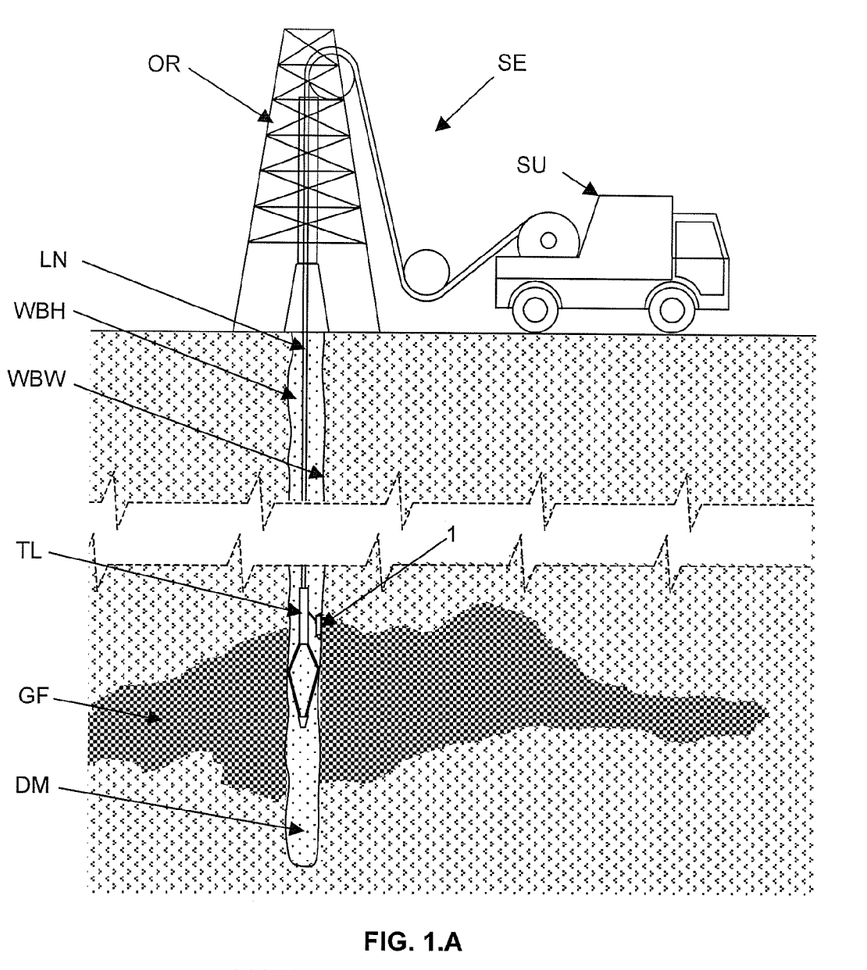

FIG. 1.A schematically shows a typical onshore hydrocarbon well location and surface equipments SE above a hydrocarbon geological formation GF after drilling operation has been carried out. At this stage, i.e. before a casing string is run and before cementing operations are carried out, the well-bore is a bore hole WBH filled with a fluid mixture DM. The fluid mixture DM is typically a mixture of drilling fluid and drilling mud. In this example, the surface equipments SE comprises an oil rig OR and a surface unit SU for deploying a logging tool TL in the well-bore WB. The surface unit may be a vehicle coupled to the logging tool by a line LN. Further, the surface unit comprises an appropriate device for determining the depth position of the logging tool relatively to the surface level. The logging tool TL may comprise a centralizer. The centralizer comprises a plurality of mechanical arm that can be deployed radially for contacting the well-bore wall WBW. The mechanical arm insures a correct positioning of the logging tool along the central axis of the well-bore hole. The logging tool TL comprises various sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements for processing, analyzing and storing the measurement data provided by the logging tool TL.

The logging tool TL comprises a probe 1 for measuring the electromagnetic properties of a subsurface formation according to the invention. Once the logging tool is positioned at a desired depth, the probe 1 can be deployed from the logging tool TL against the bore hole wall WBW by an appropriate deploying arrangement, for example an arm.

FIG. 1.B is a top cross-section view in a geological formation GF. The bore hole WBH is filled with the fluid mixture DM, generally drilling fluid and drilling mud. The bore hole wall screens the particles of mud suspended into the fluid mixture. Thus, a shallow layer of mud, the so-called mudcake MC is generally formed on the bore hole wall WBW. A flushed or invaded zone IZ forming a first concentric volume surrounds the bore hole WBH. The fluid mixture DM generally filtrates through the mudcake MC and penetrates into the formation, forming the invaded zone IZ. The radial depth of the invaded zone varies from a few inch to a few feet. A true or virgin zone VZ surrounds the invaded zone IZ. It is only filled with the natural geological formation fluid. A further transition zone may be present between the invaded zone IZ and the virgin zone VZ.

Therefore, the measurement performed by the logging tool TL are affected by the presence of the fluid mixture DM into the geological formation GF, by the size of the invaded zone IZ and by the presence and size of the mudcake MC.

Figure 2:
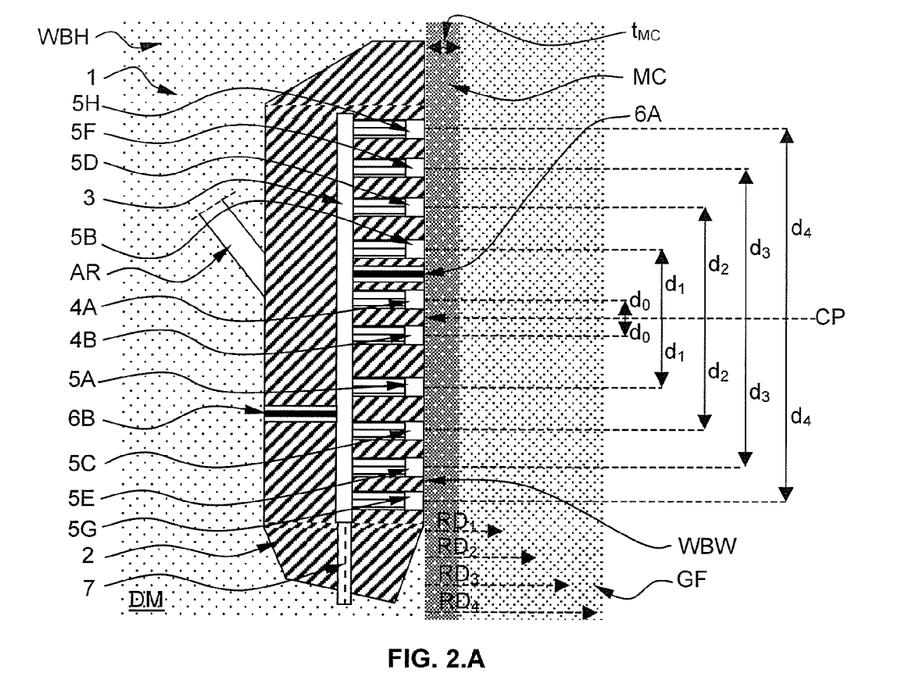

FIGS. 2.A, 2.B and 2.C show the electromagnetic probe 1 according to a cross section, a bore hole wall contacting face and a bore hole fluid contacting face views, respectively.

The electromagnetic probe 1 comprises a pad 2. The pad is a conductive metal housing, for example made in a metallic material like stainless steel. The pad 2 has a first face defining a first area arranged to be positioned in contact with a bore hole wall WBW. The other faces of the pad are arranged to be in contact with the fluid mixture DM present in the bore hole WBH.

The pad 2 is coupled to the tool TL by an arm AR (partially shown). The arm AR enables the deployment of the electromagnetic probe 1, more precisely the pad 2, from the tool TL into the bore hole WBH. In particular, a first face of the pad 2 is deployed against the bore hole wall WBW while a second face of the pad 2 is in contact with the bore hole fluid DM. In this example, the bore hole wall WBW consists in the formation GF covered by the mudcake MC.

The electromagnetic probe 1 comprises an electronic arrangement 3, two transmitting antennas 4A and 4B, and eight receiving antennas 5A, 5B, 5C, 5D, 5E, 5F, 5G and 5H. The transmitting antennas 4A and 4B and the receiving antennas 5A, 5B, 5C, 5D, 5E, 5F, 5G and 5H are positioned in the pad along a line AA' in the first face arranged to be positioned in contact with the bore hole wall WBW.

The two transmitting antennas 4A and 4B define a central point CP between them. Each antenna is spaced from a distance $d_0$ from the central point CP. The distance $d_0$ sensibly defines the electromagnetic probe vertical resolution, for example 1 inch. The transmitting antennas 4A and 4B are connected to the electronic arrangement 3. The eight receiving antennas 5A, 5B, 5C, 5D, 5E, 5F, 5G and 5H are grouped according to four sets, each set comprising two receiving antennas. Each receiving antenna of the set is positioned on each side of the transmitting antennas. Thus, each set of receiving antennas encompass the transmitting antennas.

The first set of receiving antennas comprises the first receiving antenna 5A and the second receiving antenna 5B. The first set of receiving antennas is spaced from a first distance $d_1$ from the central point CP.

The second set of receiving antennas comprises the third receiving antenna 5C and the fourth receiving antenna 5D. The second set of receiving antennas is spaced from a second distance $d_2$ from the central point CP. The second distance $d_2$ is greater than the first distance $d_1$.

The third set of receiving antennas comprises the fifth receiving antenna 5E and the sixth receiving antenna 5F. The third set of receiving antennas is spaced from a third distance $d_3$ from the central point CP. The third distance $d_3$ is greater than the second distance $d_2$.

The fourth set of receiving antennas comprises the seventh receiving antenna 5G and the height receiving antenna 5H. The fourth set of receiving antennas is spaced from a fourth distance $d_4$ from the central point CP. The fourth distance $d_4$ is greater than the third distance $d_3$.

The receiving antennas 5A, 5B, 5C, 5D, 5E, 5F, 5G and 5H are connected to the electronic arrangement 3.

The measurements provided by each receiving antenna correspond to different radial depths in the geological formation GF. The first set of receiving antennas spaced from the first distance $d_1$ from the central point CP enables to investigate the geological formation at a first radial depth $RD_1$. The second set of receiving antennas spaced from the second distance $d_2$ from the central point CP enables to investigate the geological formation at a second radial depth $RD_2$. The third set of receiving antennas spaced from the third distance $d_3$ from the central point CP enables to investigate the geological formation at a third radial depth $RD_3$. The fourth set of receiving antennas spaced from the fourth distance $d_4$ from the central point CP enables to investigate the geological formation at a fourth radial depth $RD_4$.

The maximum distance between the emitting antennas and the mostly spaced set of receiving antennas is limited by dissipation effect. This distance is typically several inches.

Additionally, the electromagnetic probe 1 comprises a first 6A and a second 6B open-ended coaxial wire. Each open-ended coaxial wire comprises an inner conductor made of a metallic material and an outer conductor shell made of an insulating material. Each open-ended coaxial wire is secured in a hole of the metallic pad.

The first open-ended coaxial wire 6A is arranged in the first side and positioned sensibly perpendicularly to the first area between a transmitting antenna and a receiving antenna, for example between the transmitting antenna 4A and the receiving antenna 5B (others positions between a transmitting antenna and any receiving antenna are possible). The first open-ended coaxial wire 6A is connected to a first open ended coaxial wire controlling circuit of the electronic arrangement 3.

The second open-ended coaxial wire 6B is arranged in the second face of the pad in contact with the well-bore fluid DM. The position of the second open-ended coaxial wire 6B within the pad is not important provided that it is in contact with the well-bore fluid. Any pad face may be convenient except the one in contact with the bore hole wall. The second open-ended coaxial wire 6B is connected to a second open ended coaxial wire controlling circuit of the electronic arrangement 3.

Further, the electromagnetic probe 1 comprises a well-bore fluid (e.g. mud) temperature sensor 7, for example a thermistance. The temperature sensor 7 is connected to the electronic arrangement 3.

Further, the electromagnetic probe 1 may comprise accelerometers, e.g. three axis accelerometers (not shown). The accelerometers are embedded in the pad in order to reference electromagnetic probe to a positioning tool within the logging tool.

One or more coaxial cables (not shown) may be run though the arm AR for connecting the electronic arrangement 3 with the tool TL. The tool TL contains the bulk of the down-hole electronics and provides energy and control commands, and gathers measurements from the electromagnetic probe 1.

Alternatively, the electronic arrangement 3 may comprise a signal generation, acquisition, processing and data communication module (not shown) for directly transmitting measurements to the surface equipment and receiving control commands from it.

Figure 3:
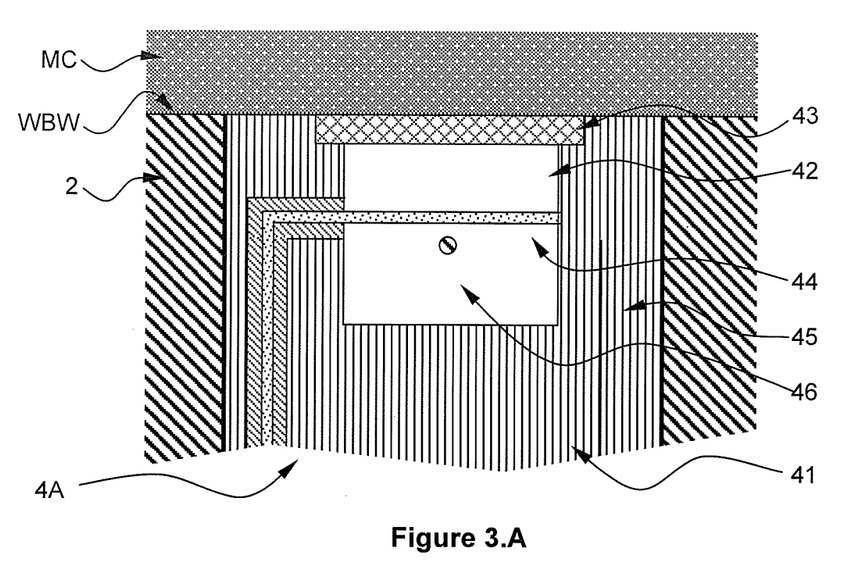

FIGS. 3.A to 3.C show a transmitting antenna 4A or any of the receiving antennas. The transmitting antenna 4A is a cross-dipole antenna that can be energized to produce electromagnetic wave having a magnetic dipole characteristic. Advantageously, the transmitting antenna is a pure magnetic point dipole. In the example of FIG. 3, the antenna 4A comprises a square aperture or cavity 42 in a metal body 41, for example stainless steel. The metal body 41 is inserted in an appropriate hole of the pad 2. Metallic antenna elements 44, 46 cross the cavity from different opposing sides. They are positioned within the cavity so as to not touch where they cross. The cavity 42 is filled with any non conductive material. The cavity 41 may be sealed by a window 43, preferably in a material that does not perturbate high frequency wave propagation. A first end of the metallic antenna elements is coupled to an associated transmitting module of the electronic arrangement by a conductor wire 45. A second end of the metallic antenna is connected to the metal body 41. The conductor wire 45 is insulated for passage through the metal body 41. This antenna is advantageous because it is adapted to measure properly two perpendicular modes with high accuracy due to the low cross-talk between the two magnetic dipoles.

The other transmitting antenna 4B is similarly constructed.

The transmitting antenna operates as follows. The cross-dipole antenna can be used to produce electromagnetic wave with a controlled magnetic dipole direction. When a current is applied to an antenna element, particular oscillation modes are excited in the cavity. Preferably, the dominant mode is the transverse electric $TE_{10}$ (evanescent mode). Thus, the transmitting antenna is sensibly a magnetic point dipole in a wide frequency range (e.g. from 10 MHz to 2 GHz) and in every down-hole media. FIGS. 3.B and 3.C schematically show a vertical antenna element 44 parallel to the longitudinal axis AA' of the logging tool and a horizontal antenna element 46 perpendicular to the longitudinal axis AA', respectively. FIG. 3.B shows an antenna operating in an endfire mode, namely energizing of the horizontal antenna element 44 (cross-section shown) results in a vertical magnetic moment (as indicated by the vertical arrow EFM). FIG. 3.C shows an antenna operating in a broadside mode, namely energizing of the vertical antenna element 46 (cross-section shown) results in a horizontal magnetic moment (as indicated by the horizontal arrow BSM).

The receiving antennas 5A, 5B, 5C, 5D, 5E, 5F, 5G and 5H may be of similar construction to that of the transmitting antennas 4A and 4B shown in FIGS. 3.A to 3.C. They are coupled to receiving modules of the electronic arrangement. The receiving antennas are excited by the transmitted electromagnetic wave component parallel to the receiving antenna magnetic dipole. The horizontal element provides an endfire signal when excited by a vertical magnetic dipole, while the vertical element provides a broadside signal when excited by a horizontal magnetic dipole.

An endfire signal excited by a horizontal magnetic dipole or a broadside signal excited by a vertical magnetic dipole are the signature of anisotropy or inhomogeneity of the geological formation as fractures and bedding.

Figure 4:
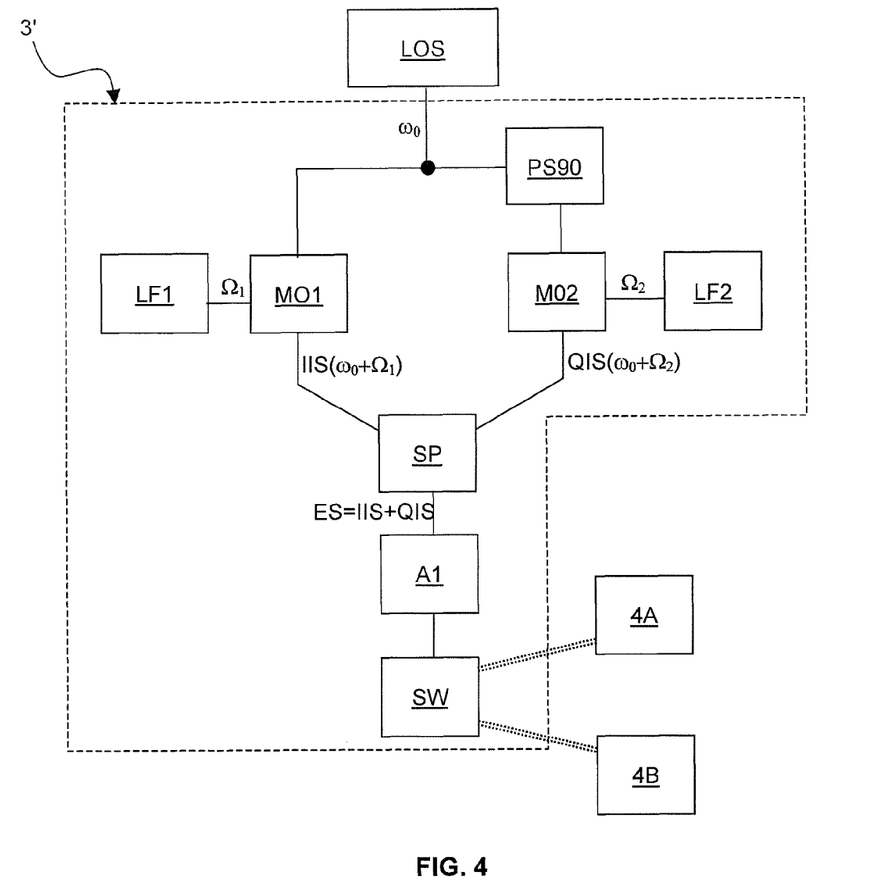
FIGS. 4 and 5 schematically show a transmitting circuit and a receiving circuit of an electronic arrangement of the probe according to the invention, respectively.
Figure 5:
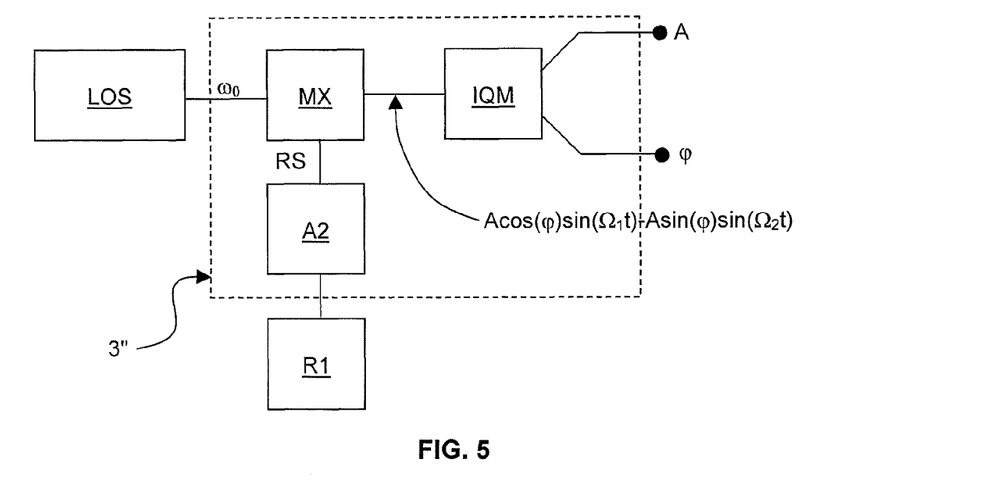

FIGS. 4 and 5 schematically show parts of the electronic arrangement 3. The electronic arrangement 3 comprises a transmitter module 3' and a receiver module 3". Advantageously, the electronic arrangement 3 has an homodyne electronics architecture, i.e. the transmitter module 3' and the receiver module 3" are both coupled to a common high frequency source LOS. The homodyne electronics architecture combined with the proximity of electronic arrangement to the transmitting and receiving antennas enables a reliable measurement of phase shift and amplitude attenuation in the geological formation by eliminating systematic error and noise sources.

The high frequency source LOS may be a dielectric resonator oscillator or a coaxial resonator oscillator. The frequency of the high frequency source LOS is variable and may be controlled via an appropriate controlling circuit, both device being well known in the art and thus will not be further described.

The usual and known energizing and control circuits are omitted in these Figures.

The transmitter module 3' is arranged to excite the transmitting antennas 4A or 4B by applying an excitation signal ES.

The receiver module 3" is arranged to determine an attenuation and a phase shift of a reception signal RS provided by a receiving antenna 5A, 5B, 5C, 5D, 5E, 5F, 5G or 5H relatively to the excitation signal ES.

FIG. 4 schematically shows the transmitter module 3'. The transmitter module 3' comprises a first low frequency source LF1, a first modulator MO1, a 90° phase-shifter PS90, a second low frequency source LF2, a second modulator MO2, a splitter SP, a first amplifier A1 and a switch SW.

The high frequency source LOS is coupled to the first modulator MO1 and to the second modulator MO1 via the 90° phase-shifter PS90. It provides to these elements a microwave signal of high frequency $\omega_0$. The high frequency may vary from around 10 MHz to around 2 GHz. The first low frequency source LF1 is coupled to the first modulator MO1. The second low frequency source LF2 is coupled to the second modulator MO2.

The modulator MO1 provides an in-phase signal IIS modulated with a low-frequency signal $\Omega_1$ (a few kHz—for example 15 kHz).

The 90° phase-shifter PS90 coupled to the modulator MO2 provides a quadrature signal QIS that is a 90° phase-shifted signal modulated with another low-frequency signal $\Omega_2$ (a few kHz—for example 10 kHz).

The low-frequency signals $\Omega_1$ and $\Omega_2$ may be chosen so as to eliminate distortion in the signal due to any direct current bias and low-frequency components noise in the source and in the modulators and also to be compatible with digital processing electronic.

The in-phase IIS signal and quadrature signal QIS are summed into a splitter SP and amplified by the power amplifier A1. The resulting excitation signal ES is then applied through a switch SW to either the vertical antenna element 44 or the horizontal antenna element 46 of the transmitting antenna 4A or 4B. Advantageously, the switch SW multiplexes the excitation signal ES to each antenna element in a sequential manner. The use of one transmitter module 3' associated with the switch is advantageous because any error (e.g. due to phase-shifter) will be common for all the transmissions. The switch SW may be coupled to the transmitting antenna 4A or 4B through a passive network (not shown) for matching impedance purpose. Alternatively, it is also possible to replace the transmitter module associated with the switch with four transmitter modules without any switch, each one being coupled to an antenna element 44 or 46 of the transmitting antenna 4A or 4B.

FIG. 5 schematically shows the receiver module 3". The receiver module 3" comprises a second amplifier A2, a mixer MX and a digitizing and processing module IQM.

The high frequency source LOS serves as a reference for the receiver module 3", in particular the mixer MX.

A receiving antenna R1 is coupled to the second amplifier A2, for example a low noise amplifier. The receiving antenna R1 provides a reception signal RS that is attenuated and phase-shifted relatively to the excitation signal ES. The reception signal RS is amplified and the resulting amplified excitation signal is provided to the mixer MIX.

The mixer MIX which also receives the signal of high frequency $\omega_0$ of the high frequency source LOS demodulates the reception signal RS. The mixer MIX provides to the digitizing and processing module IQM a signal of low frequency $A \cos(\phi)\sin(\Omega_1 t) - A \sin(\phi)\sin(\Omega_2 t)$. The digitizing and processing module IQM processes the signal and performs a synchronous detection in order to extract the in-phase component of low frequency $\Omega_1$ and the quadrature component of low frequency $\Omega_2$. The digitizing and processing module IQM provides the amplitude A and the phase $\phi$ of the reception signal.

Each antenna element 44 and 46 of each receiving antenna R1 is coupled to a receiver module 3". The receiving antenna R1 refers to the receiving antenna 5A, 5B, 5C, 5D, 5E, 5F, 5G and 5H which means that, in the electromagnetic probe example of FIG. 2, the electronic arrangement 3 comprises sixteen receiver modules 3" identical to the one hereinbefore described.

Alternatively, it is possible to replace the sixteen receiver modules 3" by a single receiver module. The single receiver module is coupled to all the receiving antennas by an appropriate switching element adapted to perform multiplexing (e.g. Time Domain Multiplexing technique).

Advantageously, the paths between the various electronic components and the antennas within the probe are well defined so that the phase delays are well defined and phases of the reception signals can be compared without error to the excitation signal.

Further, the gain and phase offset due to the high-frequency electronics chain that may affect the measurements can be cancelled with an appropriate calibration process during manufacturing process and an appropriate software correction at the probe level.

Advantageously, the high frequency source LOS is able to provide an excitation signal comprising a plurality of frequencies. This enables an excitation of the transmitting antenna according to a plurality of frequencies in a simultaneous manner. For example, a square waveform signal could be used for its harmonic content. Accordingly, all the desired frequencies are sent simultaneously into the geological formation and into the receiver circuit for simultaneous demodulation.

Figure 6:
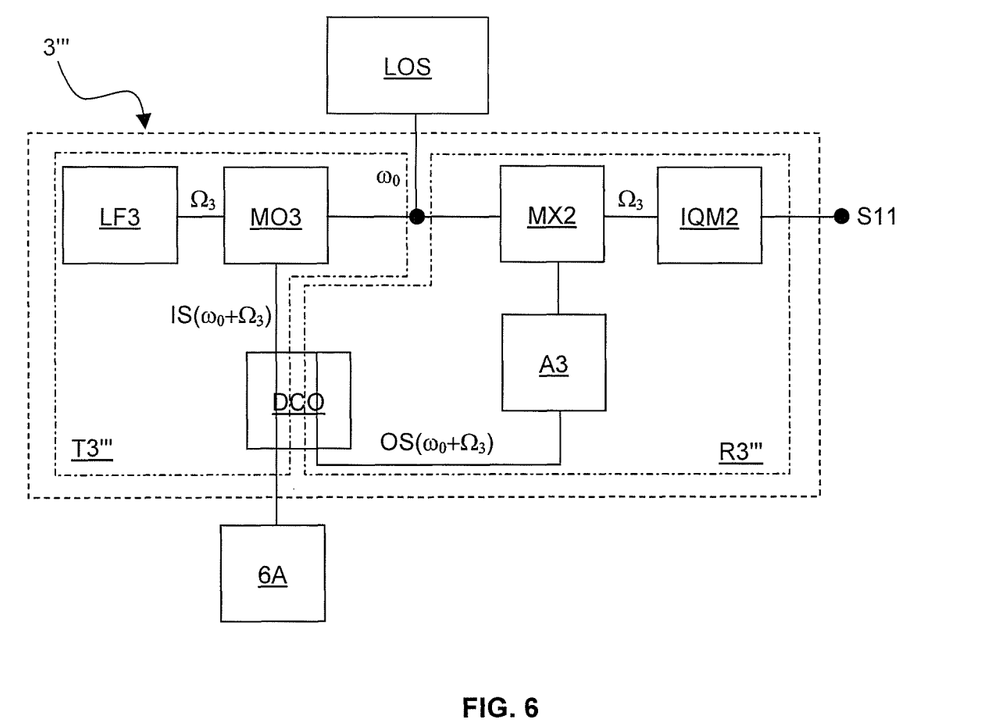
FIG. 6 schematically shows an open ended coaxial wire controlling circuit of the electronic arrangement of the probe according to the invention.

FIG. 6 schematically shows an open ended coaxial wire controlling circuit 3''' of the electronic arrangement 3 of the probe according to the invention. The controlling circuit 3''' comprises a transmitting module T3''' and a receiving module R3'''. The transmitting module T3''' and the receiving module R3''' are both coupled to a common high frequency source LOS. The controlling circuit 3''' is coupled to the first open-ended coaxial wire 6A. The usual and known energizing and control circuits are omitted in this Figure.

The transmitting module T3''' comprises a third low frequency source LF3, a third modulator MO3 and a directional coupler DCO. The receiving module R3''' comprises the directional coupler DCO, a third amplifier A3, a second mixer MX2, and a second digitizing and processing module IQM2.

The high frequency source LOS is coupled to the modulator MO3 and to the second mixer MX2. The high frequency source LOS provides to these elements a microwave signal of high frequency $\omega_0$. The high frequency may vary from around 10 MHz to around 2 GHz.

The third low frequency source LF3 is coupled to the third modulator MO3. The modulator MO3 provides an input signal IS modulated with a low-frequency signal $\Omega_3$ (a few kHz—for example 20 kHz) in phase and in quadrature. The resulting input signal IS having a frequency $\omega_0+\Omega_3$ is provided to the directional coupler DCO. The directional coupler DCO provides the input signal IS to the open-ended coaxial wire 6A.

The high frequency source LOS serves as a reference for the receiving module R3''', in particular the second mixer MX2.

The directional coupler DCO is also coupled to the third amplifier A3. The directional coupler DCO provides the output signal OS reflected by the open-ended coaxial wire 6A. The output signal OS is amplified by the amplifier A3. The resulting amplified output signal having a frequency $\omega_0+\Omega_3$ is provided to the second mixer MX2. The mixer MIX2 which also receives the signal of high frequency $\omega_0$ of the high frequency source LOS demodulates the output signal OS. The mixer MIX2 provides to the second digitizing and processing module IQM2 a signal of low frequency under the form A $\cos(\omega t+\phi)$. The digitizing and processing module IQM2 processes the signal, extracts the measured amplitude A' and phase $\phi'$ of the output signal and determines the complex reflection coefficient S11.

The gain and phase offset due to the high-frequency electronics chain that may affect the measurements, can be cancelled with an appropriate calibration process.

A sensibly identical controlling circuit is coupled to the second open-ended coaxial wire 6B and will therefore not be further described.

The electromagnetic probe according to the invention operates as described hereinafter.

The electromagnetic probe enables to perform water saturation and conductivity radial profile in a limited zone surrounding the well-bore hole (up to 4 inchs) in the horizontal and in the vertical directions. These measurements are performed at multiple depth of investigation and at multiple frequencies (e.g. ranging from 10 MHz to 2 GHz). These measurements enable to consolidate the petrophysical interpretation.

Each transmitting antenna and receiving antenna having two polarization (broadside and endfire), the electromagnetic probe enables anisotropy measurements.

The open-ended coaxial wires of the electromagnetic probe enable additional measurements. These additional measurements relate to the mudcake properties and to the fluid mixture present in the bore hole and in the invaded zone.

Transmitters-Receivers Measurements

The transmitting and receiving antennas are used to measure attenuations and phase shifts of electromagnetic wave transmitted into the geological formation and reflected and/or refracted by the geological formation. As the antennas are sensibly pure magnetic point dipole, a simple inversion enables to retrieve the apparent wave vector k. It is well known by a person skilled in the art that the wave vector k is directly linked to the permittivity and conductivity of the geological formation (this will not be further described).

The architecture of the transmitting antennas and receiving antennas in the pad enables to implement a borehole compensation scheme. This scheme is exploited to both eliminate the acquisition systematic and concentrate the measurement spatial response between the two transmitting antennas. The borehole compensation scheme results in four geometrical measurement elements, each of them corresponding to a compensated two-transmitters-receiver spacing. The four elements provide four measurements corresponding to different radial depths $RD_1$, $RD_2$, $RD_3$ and $RD_1$ (see FIG. 2.A).

The electromagnetic probe offers two magnetic dipole polarizations: the endfire polarization EF, and the broadside polarization BS. All the possible configurations for the various transmitter-receiver dipole associations can be measured. The mixed transmitter-receiver dipole associations EF-BS and BS-EF enable to perform cross-dipole measurements. The collinear transmitter-receiver dipole associations EF-EF and BS-BS enable to perform parallel-dipole measurements. The parallel-dipole and cross-dipole measurements provide different type of information.

Figure 7:
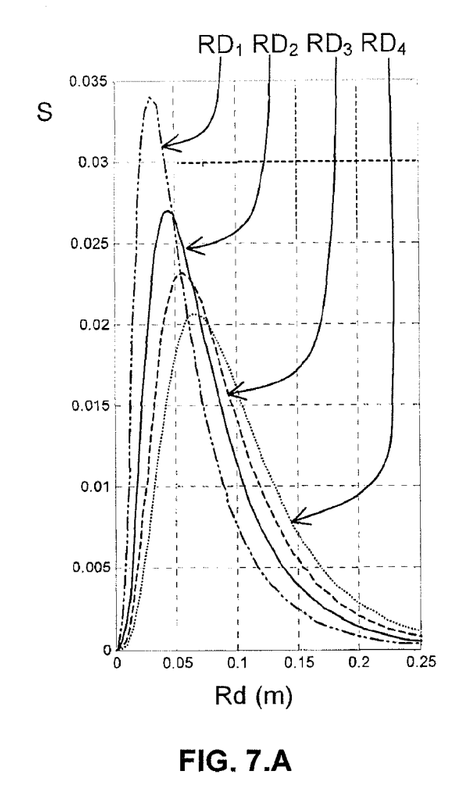

FIG. 7.A illustrates typical envelopes of the radial measurement sensitivity response for transmitting antenna/receiving antenna according to the endfire mode for the radial investigation depths RD1, RD2, RD3 and RD4. This graph illustrates that the EF-EF radial response for a given measurement element is concentrated around its radial depth of investigation.

FIG. 7.B illustrates typical envelopes of the radial measurement sensitivity response for transmitting antenna/receiving antenna according to the broadside mode for the radial investigation depths RD1, RD2, RD3 and RD4. This graph illustrates that the BS-BS radial depth of investigation has a significant contribution in the shallow region. The resulting radial depth of investigation is shallower than the EF-EF measurement.

The electric field of the endfire EF polarized antennas in homogeneous formation stands in the depth transverse plane. Hence, the EF-EF measurement is only sensitive to transverse formation properties, while the BS-BS measurement is sensitive to transverse and parallel formation properties. Using both measurements allows separating the transverse and parallel properties of the formation, and hence measuring the formation anisotropy.

The cross-dipole measurements are non-zero when the formation is anisotropic or inhomogeneous. These measurements are used to consolidate the anisotropy measurement and to characterize the presence of bed dip within the geological formation. The depth of investigation of the cross dipole is of the broadside BS type, concentrated around the broadside BS polarized antennas; hence the BS-EF and EF-BS measurements are not equivalent.

Open-Ended Coaxial Wires Measurements

The first open ended coaxial wire is in contact with the mud-cake or with the formation. The second open ended coaxial wire is exposed to the bore hole fluid mixture. The first open ended coaxial wire is operated in two ways: as standalone reflection antenna, as propagating receiver antenna when associated with the transmitting antennas, and finally as transmitter when coupled with the closest cross-dipole receivers. The second open ended coaxial wire is operated as standalone reflection antenna only.

In reflection mode, a microwave signal is sent to the open-ended coaxial wire aperture into the geological formation, the mudcake or the fluid mixture, and the reflected signal attenuation and phase shift is measured. The complex reflection coefficient generally known in the art as S11 is determined based on the measured attenuation and phase shift. The open-ended coaxial wires depth of investigation is shallow. The depth of investigation corresponds to the coaxial wire transverse section, for example around 1 mm for a 2 mm diameter wire. Consequently, the complex reflection coefficient S11 is only linked to the mudcake or the fluid mixture dielectric properties. A simple linear inversion process provides the permittivity and conductivity of the mudcake and/or the fluid mixture.

The open-ended coaxial wires may also be used in propagation mode. In this case, the open-ended coaxial wire is sensibly a pure electric dipole perpendicular to the first surface of the pad. The cavity-antennas being assimilated to magnetic dipoles, a transmission measurement with a simple forward model is hence possible. The signal delivered by the coaxial wire in transmission mode will be proportional to the normal electric field at its aperture.

The first open ended coaxial wire operating in reflection mode is used to indicate the eventual presence of mud-cake and to determine the mud-cake electromagnetic properties. It also enables to deliver an indication of the pad contact quality/efficiency. The first open ended coaxial wire operating in propagation mode is used, when associated with the transmitting antenna operating in broadside mode, to provide a non-zero measurement with an increased radial depth when compared to the reflection mode. This measurement is an additional shallow measurement that completes the magnetic dipole radial responses.

The second open ended coaxial wire is used to characterize the bore hole fluid mixture electromagnetic properties.

Measurements Summary

Therefore, various sets of measurements relating to the geological formation are possible with the electromagnetic probe:
  measurements through the cavity antennas sensibly corresponding to pure magnetic dipoles tangential to the pad plane,
  measurements through the first open-ended coaxial wire sensibly corresponding to pure electric dipole normal to the pad, the coaxial wire working in transmission, in reflection and in reception modes,
  measurements according to different polarizations,
  measurements according to different radial depths, and
  measurements according to different frequencies.

Measurements performed by means of the first open-ended coaxial wire and the eight parallel-dipole, when the transmitting antennas operate in broadside mode and in endfire mode, enable to determine the mudcake thickness and geological formation electromagnetic properties, anisotropy, and radial profile.

Measurements performed by means of the first open-ended coaxial wire and the eight cross-dipole, when the transmitting antennas operate in broadside mode and in endfire mode, enables to determine the anisotropy, dip and fractures quantifications and orientation of the geological formation.

Figure 8:
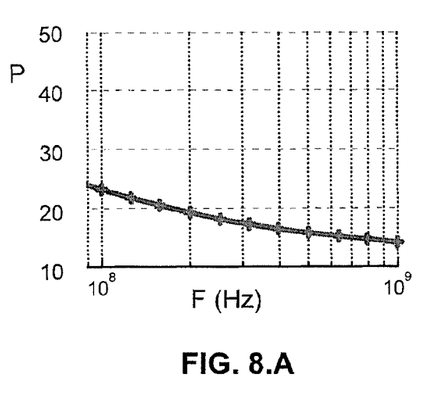

The above measurements are performed at different frequencies. The electromagnetic properties variations with frequency enable to determine additional petrophysic parameters. For example, FIG. 8.A shows typical dispersion curve relatively to the frequency of the permittivity of water filled porous rock. FIG. 8.B shows typical dispersion curve relatively to the frequency of the conductivity of water filled porous rock.

Moreover, additional sets of measurements relating to the mudcake and/or to the fluid mixture electromagnetic properties may be performed with the electromagnetic probe by means of the first and second open-ended coaxial wires working in reflection. The additional sets of measurements may also be performed according to different frequencies.

After reconciling the radial investigation depth at different frequencies, a radial characterization of the geological formation is possible.

Finally, assuming the fluid mixture electromagnetic properties are known, it is possible to identify the fractures orientations within the geological formation. The fractures may be natural fractures due to the geological formation stress or fractures induced by the drilling operation. The fractures may be filled with the fluid mixture from the bore hole (generally conductive because enriched in water) or with hydrocarbon fluid mixture (generally resistive).

If a fracture is parallel to the pad axis, a resistive fluid filled fracture will create a sensibly zero signal according to the broadside mode and an important signal according to the endfire mode.

If a fracture is perpendicular to the pad axis, a resistive fluid filled fracture will create an important signal according to the broadside mode and a sensibly zero signal according to the endfire mode.

If a fracture is tilted relatively to the pad axis, a resistive fluid filled fracture will create a signal being a combination of the broadside mode and the endfire mode.

Final Remarks

A particular application of the invention relating to a wireline tool has been described. However, it is apparent for a person skilled in the art that the invention is also applicable to a logging-while-drilling tool. A typical logging-while-drilling tool is incorporated into a bottom hole assembly attached to the end of a drill swing with a drill bit attached at the extreme end thereof. Measurements can be made either when the drill string is stationary or rotating. In the latter case an additional measurement is made to allow the measurements to be related to the rotational position of the drill string in the bore hole. This is preferably done by making simultaneous measurements of the direction of the earth's magnetic field with a compass which can be related to a reference measurement made when the drill string is stationary. It will also be apparent for a man skilled in the art that the invention is applicable to onshore and offshore hydrocarbon well location.

It is apparent that the term "pad" used hereinbefore generically indicates a contacting element with the surface of the bore hole wall. The particular contacting element shown in the Figures for maintaining the antennas in engagement with the bore hole wall is illustrative and it will be apparent for a man skilled in the art that other suitable contacting element may be implemented, for example a sonde with a backup arm. The same remark is also applicable to the particular probe deploying system shown on the Figures.

Finally, it is also apparent for a person skilled in the art that application of the invention to the oilfield industry is not limitative as the invention can also be used in others types of geological surveys.

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A probe for measuring electromagnetic properties of a subsurface formation, comprising:
   a) a pad having a first face adapted for engagement with a borehole wall;
   b) at least one pair of transmitting antennas;
   c) at least two pairs of receiving antennas, wherein the at least one pair of transmitting antennas and the at least two pairs of receiving antennas are mounted in the first face of the pad, and each of the at least two pairs of receiving antennas comprises a first receiving antenna and a second receiving antenna, and each of the first receiving antennas is distributed on one side of the at least one pair of transmitting antennas and each of the second receiving antennas is distributed on an opposite side of the at least one pair of transmitting antennas; and
   d) an electronic arrangement comprising at least one transmitter module arranged to operate the at least one pair of transmitting antennas in either a broadside mode or an endfire mode by applying an excitation signal modulated by at least a first frequency and a second frequency, and at least one receiver module arranged to determine an attenuation and a phase shift of each reception signal provided by each receiving antenna relatively to the excitation signal;
   wherein the electronic arrangement further comprises a high frequency source and the transmitter module comprises a first low frequency source for the first frequency, a first modulator, a 90 degree phase-shifter, a second low frequency source for the second frequency, a second modulator, a splitter, a first amplifier and a switch, wherein the high frequency source is coupled to the second modulator via the 90 degree phase-shifter, the first low frequency source is coupled to the first modulator, the second low frequency source is coupled to the second modulator, the first modulator and the second modulator are coupled to the splitter, the splitter is coupled to the amplifier, and the amplifier is coupled to the switch, such that in operation the first modulator provides an in-phase signal IIS modulated with the first frequency and the second modulator provides a quadrature signal QIS that is a 90 degree phase-shifted signal modulated with the second frequency, and the IIS and QIS signals are summed in the splitter and amplified by the amplifier to produce the excitation signal which is applied through the switch to the transmitting antennas.

2. A probe according to claim 1, wherein the first frequency is about 15 kHz or less, and the second frequency is about 10 kHz or less.

3. A probe according to claim 1, wherein the high frequency source has a frequency ranging from about 10 MHz to about 2 GHz, and the first frequency is about 15 kHz or less, and the second frequency is about 10 kHz or less.

4. A probe according to claim 1, wherein the first frequency and second frequency are chosen to reduce distortion in the excitation signal.

5. A probe according to claim 1, wherein the probe further comprises a first open-ended coaxial wire arranged in the first face, perpendicular to the first face, and between one of the transmitting antennas and one of the receiving antennas; wherein the electronic arrangement further comprises a first open-ended coaxial wire controlling circuit, said circuit comprising:
   a transmitting module for sending a high-frequency input signal into the first open-ended coaxial wire, and
   a receiving module for determining a first reflection coefficient based on a high-frequency output signal reflected by the first open-ended coaxial wire and a propagation coefficient based on a high-frequency output signal received by the first open-ended coaxial wire following an excitation of the transmitting antennas.

6. A probe according to claim 5, wherein the probe further includes a second open-ended coaxial wire, wherein the electronic arrangement further comprises a second open-ended coaxial wire controlling circuit, said circuit comprising:
   a transmitting module for sending a high-frequency input signal into the second open-ended coaxial wire, and
   a receiving module for determining a second reflection coefficient based on a high-frequency output signal reflected by the second open-ended coaxial wire.

7. A system for measuring electromagnetic properties of a subsurface formation, comprising: a logging tool and a probe coupled to the tool by a deployment arrangement, wherein the probe comprises:
   a) a pad having a first face adapted for engagement with a borehole wall;
   b) at least one pair of transmitting antennas;
   c) at least two pairs of receiving antennas, wherein the at least one pair of transmitting antennas and the at least two pairs of receiving antennas are mounted in the first face of the pad, and each of the at least two pairs of receiving antennas comprises a first receiving antenna and a second receiving antenna, and each of the first receiving antennas is distributed on one side of the at least one pair of transmitting antennas and each of the second receiving antennas is distributed on an opposite side of the at least one pair of transmitting antennas; and,
   d) an electronic arrangement comprising at least one transmitter module arranged to excite the transmitting antennas by applying an excitation signal modulated by at least a first frequency and a second frequency, and at least one receiver module coupled to at least one receiving antenna of the receiving antennas and arranged to determine an attenuation and a phase shift of each reception signal provided by each receiving antenna relatively to the excitation signal; wherein the electronic arrangement further comprises a high frequency source and the transmitter module comprises a first low frequency source for the first frequency, a first modulator, a 90 degree phase-shifter, a second low frequency source for the second frequency, a second modulator, a splitter, a first amplifier and a switch, wherein the high frequency source is coupled to the second modulator via the 90 degree phase-shifter, the first low frequency source is coupled to the first modulator, the second low frequency source is coupled to the second modulator, the first modulator and the second modulator are coupled to the splitter, the splitter is coupled to the amplifier, and the amplifier is coupled to the switch, such that in operation the first modulator provides an in-phase signal IIS modulated with the first frequency and the second modulator provides a quadrature signal QIS that is a 90 degree phase-shifted signal modulated with the second frequency, and the IIS and QIS signals are summed in the splitter and amplified by the amplifier to produce the excitation signal which is applied through the switch to the transmitting antennas.

8. A system according to claim 7, wherein the probe further comprises a first open-ended coaxial wire arranged in the first face, perpendicular to the first face, and between one of the transmitting antennas and one of the receiving antennas; wherein the electronic arrangement further comprises a first open-ended coaxial wire controlling circuit, said circuit comprising:
   a transmitting module for sending a high-frequency input signal into the first open-ended coaxial wire, and
   a receiving module for determining a first reflection coefficient based on a high-frequency output signal reflected by the first open-ended coaxial wire and a propagation coefficient based on a high-frequency output signal received by the first open-ended coaxial wire following an excitation of the transmitting antennas.

9. A system according to claim 7, wherein each of the transmitting antennas is identical and arranged to transmit electromagnetic energy according to a broadside mode and an endfire mode, and each of the receiving antennas is identical and arranged to receive electromagnetic energy according to a broadside mode and an endfire mode.

10. A system according to claim 9, wherein each of the antennas is a cross-dipole antenna.

11. A system according to claim 7, wherein the deployment arrangement is an arm.

12. A system according to claim 7, wherein each antenna in each of the respective pairs of antennas is spaced equidistant from a central point.

13. A system according to claim 8, wherein the probe further includes a second open-ended coaxial wire, wherein the electronic arrangement further comprises a second open-ended coaxial wire controlling circuit, said circuit comprising:
   a transmitting module for sending a high-frequency input signal into the second open-ended coaxial wire, and
   a receiving module for determining a second reflection coefficient based on a high-frequency output signal reflected by the second open-ended coaxial wire.

* * * * *